United States Patent
Fan et al.

(10) Patent No.: US 11,411,422 B2
(45) Date of Patent: Aug. 9, 2022

(54) BATTERY CHARGING METHOD, BATTERY CHARGING APPARATUS AND STORAGE MEDIUM

(71) Applicant: Beijing Xiaomi Mobile Software Co., Ltd., Beijing (CN)

(72) Inventors: Jie Fan, Beijing (CN); Changyu Sun, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 185 days.

(21) Appl. No.: 16/819,731

(22) Filed: Mar. 16, 2020

(65) Prior Publication Data

US 2021/0126483 A1  Apr. 29, 2021

(30) Foreign Application Priority Data

Oct. 23, 2019 (CN) .......................... 201911014285.3

(51) Int. Cl.
*H01M 10/44* (2006.01)
*H02J 7/00* (2006.01)

(52) U.S. Cl.
CPC ........ *H02J 7/00714* (2020.01); *H02J 7/0029* (2013.01); *H02J 7/0047* (2013.01); *H02J 7/007194* (2020.01)

(58) Field of Classification Search
CPC .... H02J 7/00714; H02J 7/0029; H02J 7/0047; H02J 7/007194; H02J 7/00041;
(Continued)

(56) References Cited

U.S. PATENT DOCUMENTS 5,656,916 A * 8/1997 Hotta ...................... B60L 50/51
320/160
9,461,492 B1  10/2016 Berkowitz et al.
(Continued)

FOREIGN PATENT DOCUMENTS

CN  102280670 A  12/2011
CN  103078356 A  5/2013
(Continued)

OTHER PUBLICATIONS

Extended European Search Report in the European Application No. 20167883.6, dated Jul. 30, 2020.
(Continued)

*Primary Examiner* — Nghia M Doan
(74) *Attorney, Agent, or Firm* — Finnegan, Henderson, Farabow, Garrett & Dunner, L.L.P.

(57) ABSTRACT

A battery charging method applied to a terminal, includes: charging a battery with an initial-stage charging current in an initial stage, until a charge state of the battery satisfies a preset condition, wherein the initial-stage charging current is a maximum tolerable charging current of the battery determined according to charging configuration information of the battery; and charging the battery with a subsequent-stage charging current in a subsequent stage after the initial stage, wherein the subsequent-stage charging current is determined according to the charging configuration information and is smaller than the maximum tolerable charging current.

17 Claims, 5 Drawing Sheets

(58) Field of Classification Search
CPC ... H02J 7/00036; H02J 7/00712; Y02E 60/10; H01M 10/44; H01M 10/443; H01M 10/446; G01R 31/3835; G01R 31/392

See application file for complete search history.

(56) References Cited

U.S. PATENT DOCUMENTS

| | | | |
|---|---|---|---|
| 9,846,201 | B2 * | 12/2017 | Nakayama ............... G06F 1/263 |
| 10,447,055 | B1 | 10/2019 | Berkowitz et al. |
| 2014/0167685 | A1 | 6/2014 | Tang et al. |
| 2018/0316206 | A1 | 11/2018 | Luo et al. |
| 2020/0361333 | A1 * | 11/2020 | Satoh ................ H02J 7/007194 |

FOREIGN PATENT DOCUMENTS

| | | |
|---|---|---|
| CN | 103682498 A | 3/2014 |
| CN | 103701173 A | 4/2014 |
| CN | 104317344 A | 1/2015 |
| CN | 104348196 A | 2/2015 |
| CN | 105098268 A | 11/2015 |
| CN | 105762887 A | 7/2016 |
| CN | 105870526 A | 8/2016 |
| CN | 106129503 A | 11/2016 |
| CN | 106785134 A | 5/2017 |
| CN | 108574123 A | 9/2018 |
| CN | 109270465 A | 1/2019 |
| CN | 109616712 A | 4/2019 |
| EP | 2824753 A1 | 1/2015 |
| JP | 2009-207312 A | 9/2009 |
| KR | 2000-0019006 A | 4/2000 |
| KR | 2007-0113100 A | 11/2007 |
| KR | 20120134931 A | 12/2012 |
| WO | WO 2013182373 A2 | 12/2013 |

OTHER PUBLICATIONS

Zhang Caiping et al., Study of a step-current charging method for power lithium-ion batteries, High Technology News, vol. 23, No. 4, Apr. 30, 2013, pp. 430-435.

Fang, W. et al., Maximum Power Point Tracking with Dichotomy and Gradient Method for Automobile Exhaust Thermoelectric Generators, Journal of Electronic Materials, vol. 45, No. 3, Nov. 5, 2015, pp. 1613-1624.

First Office Action of Chinese Application No. 201911014285.3, dated Oct. 29, 2020.

Notification to Grant Patent Right for Invention in Chinese Application No. 201911014285.3, dated Jun. 3, 2021.

International Search Report in the International Application No. PCT/CN2019/128863, dated Jul. 15, 2020.

Notification of Reason for Refusal dated Oct. 28, 2021, from the Korean Intellectual Property Office issued in counterpart Korean Application No. 10-2020-7007726.

Notice of Reasons for Refusal dated Jan. 31, 2022, from the Japanese Patent Office issued in counterpart Japanese Application No. 2020-515886.

* cited by examiner

BATTERY CHARGING METHOD, BATTERY CHARGING APPARATUS AND STORAGE MEDIUM

CROSS-REFERENCE TO RELATED APPLICATIONS

The present application is based on and claims priority to Chinese Patent Application No. 201911014285.3 filed on Oct. 23, 2019, the entire content of which is incorporated herein by reference.

TECHNICAL FIELD

The disclosure relates to the technical field of terminals, and particularly to a battery charging method, a battery charging apparatus and a storage medium.

BACKGROUND

With development of technologies, functions of terminals such as mobile phones and tablets are increasingly improved. Users can socialize, entertain and process personal services with the terminals. Larger screens, higher frequencies of usage and more usage time of the terminals cause higher user requirements on batteries of the terminals.

SUMMARY

A battery charging method, a battery charging apparatus and a storage medium are provided in the disclosure.

According to one aspect of embodiments of the disclosure, a battery charging method applied to a terminal, includes: in an initial stage, charging a battery with an initial-stage charging current, until a charge state of the battery satisfies a preset condition, wherein the initial-stage charging current is a maximum tolerable charging current of the battery determined according to charging configuration information of the battery; and in a subsequent stage after the initial stage, charging the battery with a subsequent-stage charging current, wherein the subsequent-stage charging current is determined according to the charging configuration information and is smaller than the maximum tolerable charging current.

According to another aspect of embodiments of the disclosure, a terminal includes a processor; and a memory configured to store instructions executable by the processor, wherein the processor is configured to: charge a battery with an initial-stage charging current in an initial stage, until a charge state of the battery satisfies a preset condition, wherein the initial-stage charging current is a maximum tolerable charging current of the battery determined according to charging configuration information of the battery; and charge the battery with a subsequent-stage charging current in a subsequent-stage after the initial stage, wherein the subsequent-stage charging current is determined according to the charging configuration information and is smaller than the maximum tolerable charging current.

According to another aspect of embodiments of the disclosure, a non-transitory computer-readable storage medium has stored therein instructions that, when executed by a processor of a terminal, cause the terminal to perform the battery charging method above.

It should be understood that the general description above and detailed description below are merely exemplary and explanatory, and are not intended to limit the disclosure.

BRIEF DESCRIPTION OF THE DRAWINGS

The accompanying drawings herein are incorporated into the specification and constitute part of the present specification, illustrate embodiments consistent with the disclosure and are intended for explaining the principles of the disclosure together with the specification.

DETAILED DESCRIPTION

Detailed description will be made here to exemplary embodiments, examples of which are illustrated in the accompanying drawings. When drawings are referred to in the following description, identical numerals in different drawings refer to identical or similar elements, unless otherwise indicated. Implementations described in the following exemplary embodiments do not represent all the implementations consistent with the disclosure. On the contrary, they are merely examples of apparatuses and methods consistent with some aspects of the disclosure recited in the appended claims.

In embodiments of the present disclosure, a charger chip, a battery cell and a battery protection board are customized according to respective charging powers. For a battery and a charger product, margins are set in performance parameters such as the current tolerance capability of the charger chip, the current tolerance capability of the battery cell and the over-current capability of the battery protection board, to satisfy the demand of usage safety.

Figure 1:
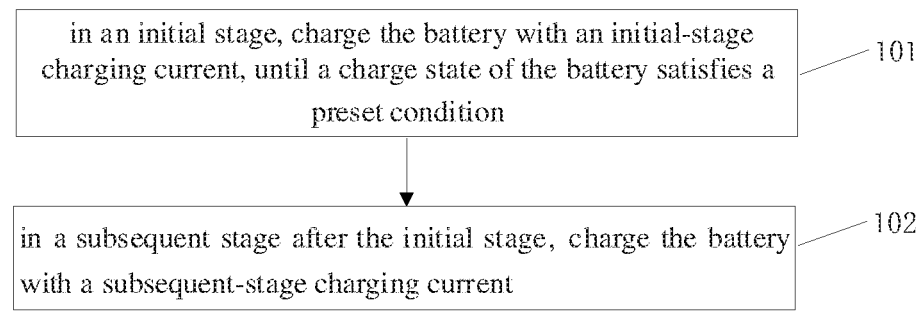
FIG. 1 illustrates a flow chart of a battery charging method according to an exemplary embodiment of the disclosure.

FIG. 1 illustrates a flow chart of a battery charging method according to an exemplary embodiment of the disclosure. For example, the battery charging method is applied to a terminal installed with a battery. The terminal may be for example a smart phone, a tablet, a wearable device or a PC machine. The type of the terminal to which the battery charging method is applied is not limited in embodiments of the disclosure. As illustrated in FIG. 1, the battery charging method includes the following steps.

In step S101, the battery is charged with an initial-stage charging current in an initial stage, until a charge state of the battery satisfies a preset condition.

The initial-stage charging current may be a maximum tolerable charging current of the battery, which is determined according to charging configuration information of the battery.

The maximum tolerable charging current of the battery during charging is determined according to the charging configuration information of the battery, so as to charge the battery in the initial stage with the maximum tolerable charging current of the battery during charging.

In step S102, the battery is charged with a subsequent-stage charging current in a subsequent stage after the initial stage.

The subsequent-stage charging current may be a charging current determined according to the charging configuration information, and is smaller than the maximum tolerable charging current.

According to the embodiments of the disclosure, in an initial stage, a battery is charged with a maximum tolerable charging current of the battery, which is determined according to charging configuration information of the battery, until a charge state of the battery satisfies a preset condition; and in a subsequent stage after the initial stage, the battery is charged with a charging current, which is determined according to the charging configuration information and smaller than the maximum tolerable charging current. Existing charging configurations can be fully utilized without increasing design costs, so as to save charging time, improve charging efficiency, and thus promote user experience.

In an embodiment of the disclosure, the charging configuration information of the battery includes: information of a charging chip, information of a battery cell, and information of a battery protection board.

The information of the charging chip may include information of a maximum tolerable current value of the charging chip, and information of a current value corresponding to a highest charging efficiency.

The information of the battery cell may include an energy density value of the battery, and a corresponding maximum current value that does not affect the service life of the battery.

The information of the battery protection board may include a maximum tolerable continuous-current value of the battery protection board, an extreme tolerable current value of the battery protection board when the charging current is greater than the maximum continuous-current value, and temperature rise information corresponding to the extreme current value.

For example, the charging chip may be of a parallel-charging type. The maximum tolerable current value of a chip is 6 A. The current value with which the battery reaches an optimal charging efficiency is 5 A.

Also for example, the maximum tolerable continuous-current value of the battery protection board is 5 A. When the current value is greater than the maximum continuous-current value 5 A, for example, 6 A, the battery can be charged for 20 minutes continuously without damaging the battery protection board.

As another example, the maximum continuous-charging current value corresponding to the energy density value of the battery cell is 5 A. The service life of the battery cell will not be affected when charging the battery with a charging current value of 5.5 A.

The information of the charging chip, the information of the battery cell and the information of the battery protection board of the battery are analyzed respectively, to determine the maximum tolerable charging current of the battery in the battery charging method. The maximum tolerable current value of a charging chip is determined according to the information of the charging chip, the maximum tolerable current value of a battery cell is determined according to the information of the battery cell, and the maximum tolerable current value of a battery protection board is determined according to the information of the battery protection board.

In the embodiment, the information of the charging chip, the information of the battery cell and the information of the battery protection board of the battery are analyzed together.

For example, the maximum tolerable current value of the charging chip, the maximum tolerable current value of the battery cell, and the maximum tolerable current value of the battery protection board are considered comprehensively, and the minimum value among the maximum tolerable current value of the charging chip, the maximum tolerable current value of the battery cell, and the maximum tolerable current value of the battery protection board is determined to be the maximum tolerable charging current of the battery, namely, the initial-stage charging current. The battery is charged with the maximum tolerable charging current of the battery obtained after those values are considered. Not only the service life of the battery is not affected, but also the charging time can be shortened, thus promoting user experience.

In the embodiment, the minimum value among the maximum tolerable current value of the charging chip, the maximum tolerable current value of the battery cell, and the maximum tolerable current value of the battery protection board is taken to be the maximum tolerable charging current of the battery, that is, the initial-stage charging current.

For example, a minimum value 5.5 A among the maximum tolerable current value of the charging chip, the maximum tolerable current value of the battery cell, and the maximum tolerable current value of the battery protection board is determined to be the maximum tolerable charging current, that is, the initial-stage charging current.

In an embodiment of the disclosure, the charging configuration information further includes charging count information. When the charging count information indicates that a charging count is cleared, the preset condition is that a charge amount of the battery reaches a specified charge amount threshold. The specified charge amount threshold is determined according to a maximum charge amount, and a maximum tolerable charging duration in which the battery can be charged with the maximum tolerable charging current.

The charging count information may indicate whether the battery charging counter is cleared or not after the battery charger is plugged in/out.

When the charging count information indicates that a charging count is cleared (that is, when the charger is plugged in/out, the charging time will be cleared), the battery is charged with an initial-stage charging current until the charge amount of the battery reaches the specified charge amount threshold. The specified charge amount threshold is determined according to a maximum charge amount, and a maximum tolerable charging duration in which the battery can be charged with the maximum tolerable charging current. In this way, the safety of the charging method can be improved so as to ensure the usage safety, while ensuring the charging effect.

When the charging count information indicates that the charging count is not cleared, the battery is charged with the initial-stage charging current in the maximum tolerable charging duration in which the battery can be charged with the maximum tolerable charging current.

In an embodiment, the maximum tolerable charging duration in which the battery can be charged with the maximum tolerable charging current is: a minimum value among a maximum tolerable duration of the charging chip, a maximum tolerable duration of the battery cell, and a maximum tolerable duration of the battery protection board, when the battery is charged with the maximum tolerable charging current, and a surface temperature of the terminal does not exceed a preset temperature threshold.

The maximum tolerable duration of the charging chip, the maximum tolerable duration of the battery cell, and the maximum tolerable duration of the battery protection board when the battery is charged with the maximum tolerable charging current are analyzed together. For example, a minimum value among the maximum tolerable duration of the charging chip, the maximum tolerable duration of the battery cell, and the maximum tolerable duration of the battery protection board when the battery is charged with the maximum tolerable charging current is determined to be the maximum tolerable charging duration in which the battery can be charged with the maximum tolerable charging current. In this way, the charging time can further be shortened and a charging efficiency can be improved, while safety is guaranteed.

For example, the battery charging power may be 27 w, and the charging chip has an architecture including a main charging chip and a secondary charging chip. The main charging chip is used in a trickle charging stage and a constant-voltage charging stage. The secondary charging chip is used in a constant-current stage and a part of a constant-voltage stage. The maximum tolerable current value of the main charging chip is 4 A, and the current value corresponding to a highest charging efficiency is 3 A. The maximum tolerable current value of the secondary charging chip is 8 A, and the current value corresponding to a highest charging efficiency is 6 A.

Also for example, the information of the battery cell includes: the battery is made of a material with a high energy density; the maximum tolerable current value is 6 A; and the service life of the battery will not be affected when the battery is charged with a charging current value of 6.5 A. The impedance of the battery cell will slightly rise with the increase of the battery temperature. When the temperature of the battery does not exceed 42° C., the impedance of the battery cell will not be affected.

As another example, the information of the battery protection board may include: a maximum tolerable continuous-current value of the battery protection board is 5.4 A; and the battery protection board can tolerate a current greater than the maximum tolerable continuous-current value, for example an extreme current value of 6 A, for 15 minutes. Under the condition that the charging current value is 6 A and the charging time is 15 minutes, the temperature of the battery will not exceed 43° C.

The temperature control information of the battery may include that the surface temperature of the terminal does not exceed 40° C.

By comprehensively analyzing the information above, the maximum tolerable charging current of the battery which is determined according to the charging configuration information of the battery, that is, the initial-stage charging current, is 6 A, which depends on the current tolerance capacity of the battery protection board.

When a preset temperature threshold is 40° C., the surface temperature of the terminal does not exceed the preset temperature threshold, and the battery is charged with 6 A, among the maximum tolerable duration of the charging chip, the maximum tolerable duration of the battery cell, and the maximum tolerable duration of the battery protection board, the maximum tolerable duration of the battery protection board, i.e., 15 minutes, is minimum.

In the case that the charging counter clears the charging time after the charger is plugged in/out, by taking the battery charging power of 27 w as an example, the initial-stage charging current is determined to be 6 A. The charging duration of charging with the initial-stage charging current of 6 A is 15 minutes. The charge amount of the battery charged in the initial stage is calculated. For example, if the battery capacity is 4000 mAh, after charging for 15 minutes with the initial-stage charging current of 6 A, the charge amount charged in the initial stage is 40% of the battery capacity.

In the case that the charging counter clears the charging time after the charger is plugged in/out, the battery is charged with a charging current of 6 A before the charge amount of the battery reaches 40% of the battery capacity.

In the case that the charging counter does not clear the charging time after the charger is plugged in/out, the battery is charged for 15 minutes with the initial-stage charging current of 6 A.

Figure 2:
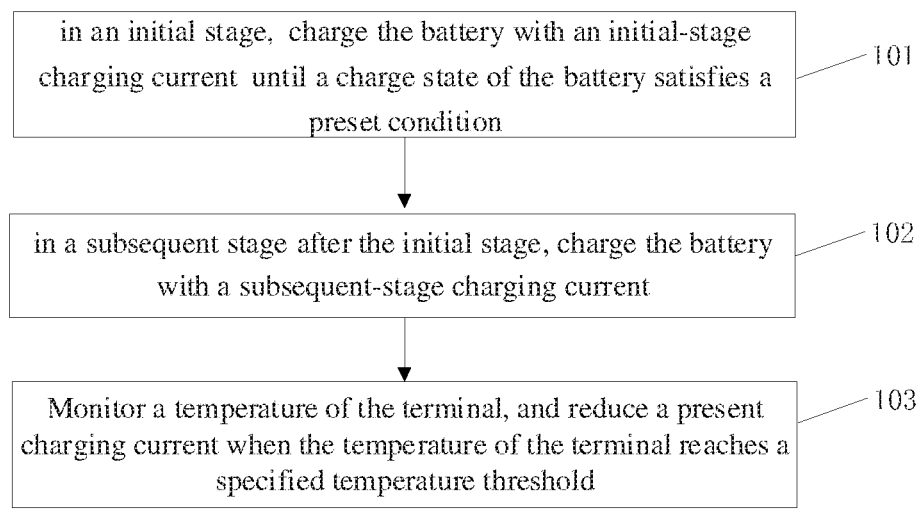
FIG. 2 illustrates a flow chart of a battery charging method according to an exemplary embodiment of the disclosure.

FIG. 2 illustrates a flow chart of a battery charging method according to an exemplary embodiment of the disclosure. As illustrated in FIG. 2, the battery charging method further includes the following step.

In step S103, a temperature of the terminal is monitored, and a present charging current is reduced when the temperature of the terminal reaches a specified temperature threshold.

The specified temperature threshold is determined according to a highest tolerable temperature of a surface of the terminal, and the highest tolerable temperature is determined according to temperature control information of the battery. In the process of charging the battery, the temperature of the terminal, such as an overall temperature or a surface temperature of the terminal, may be monitored not to exceed the specified temperature threshold, in order to protect the safety of the terminal in use. By controlling the surface temperature of the terminal, it can avoid the surface temperature of the terminal from rising too fast and affecting user experience.

Still taking the charging power of 27 w as an example, according to the temperature control information of the battery, the highest tolerable temperature of the surface of the terminal is determined to be 40° C., and the specified temperature threshold is determined to be 38° C. When the surface temperature of the terminal is lower than 38° C., the battery may be charged with an initial-stage charging current, that is 6 A, for a duration of 15 minutes. In the 15 minutes, when it is detected that the surface temperature of the terminal exceeds 38° C., the present charging current is reduced to, for example, 5.4 A.

In an embodiment, the specified temperature threshold is lower than the highest tolerable temperature. The subsequent-stage charging current includes a maximum continuous-charging current and an efficiency-optimal charging current.

It is to be understood that, in the process of charging the battery, with the increase of the surface temperature of the terminal, the used numeric value of the charging current will be correspondingly reduced stepwise, to satisfy the requirement of controlling the battery temperature of the terminal. Furthermore, in the process of charging the battery, the battery is charged with the efficiency-optimal charging current, to improve the efficiency of charging the battery. For example, in an embodiment, the overall temperature of the terminal is not higher than 40° C. in the entire charging process.

Still taking the charging power of 27 w as an example, it is determined, according to the temperature control information of the battery, that the highest tolerable temperature of the surface of the terminal may be 40° C. and the specified temperature threshold may be 38° C., so that the specified temperature threshold is lower than the highest tolerable temperature.

For the subsequent-stage charging current, the maximum continuous-charging current may be 5.4 A. and the efficiency-optimal charging current may be 3 A.

The battery is charged with the maximum continuous-charging current 5.4 A when the surface temperature of the terminal is lower than the specified temperature threshold 38° C.

The battery is charged with a charging current lower than the maximum continuous-charging current 5.4 A and higher than the efficiency-optimal charging current 3 A, when the surface temperature of the terminal is higher than the specified temperature threshold 38° C. and is lower than the highest tolerable temperature 40° C. For example, the battery is charged with a charging current of 4.3 A, so as to avoid the surface temperature of the terminal from rising too fast and affecting user experience.

The battery is charged with the efficiency-optimal charging current 3 A, when the surface temperature of the terminal reaches the highest tolerable temperature 40° C.

In an embodiment, when the surface temperature of the terminal is lower than the specified temperature threshold and the charging voltage of the battery reaches a saturation voltage, the battery is charged with a charging current lower than the maximum continuous-charging current and higher than an efficiency-optimal charging current. The charging current is controlled without considering the temperature control factor, in order to ensure that the battery is charged more fully.

When the charging voltage for the battery exceeds the saturation voltage, the charging voltage of the battery is increased to compensate for the situation where the charging saturation degree of the battery is affected due to internal resistance of the battery. The battery is continued to be charged, until the charging current reaches a preset minimum current threshold. Then, the battery is charged with a charging current corresponding to the minimum current threshold, until the charging ends.

Still taking the charging power of 27 w as an example, the specified temperature threshold is 38° C., and the saturation voltage of the battery is 4.3V. The battery is charged with a charging current lower than the maximum continuous-charging current and higher than the efficiency-optimal charging current, which may be 4.3 A. When the surface temperature of the terminal does not exceed 38° C., and the voltage of the battery reaches the saturation voltage 4.3V, the charging current is adjusted to 4.3 A.

When the charging voltage of the battery exceeds the saturation voltage, for example when the voltage of the battery reaches 4.4V, the charging voltage is increased to be slightly higher than the saturation voltage of the battery, for example to 4.45V.

Figure 3:
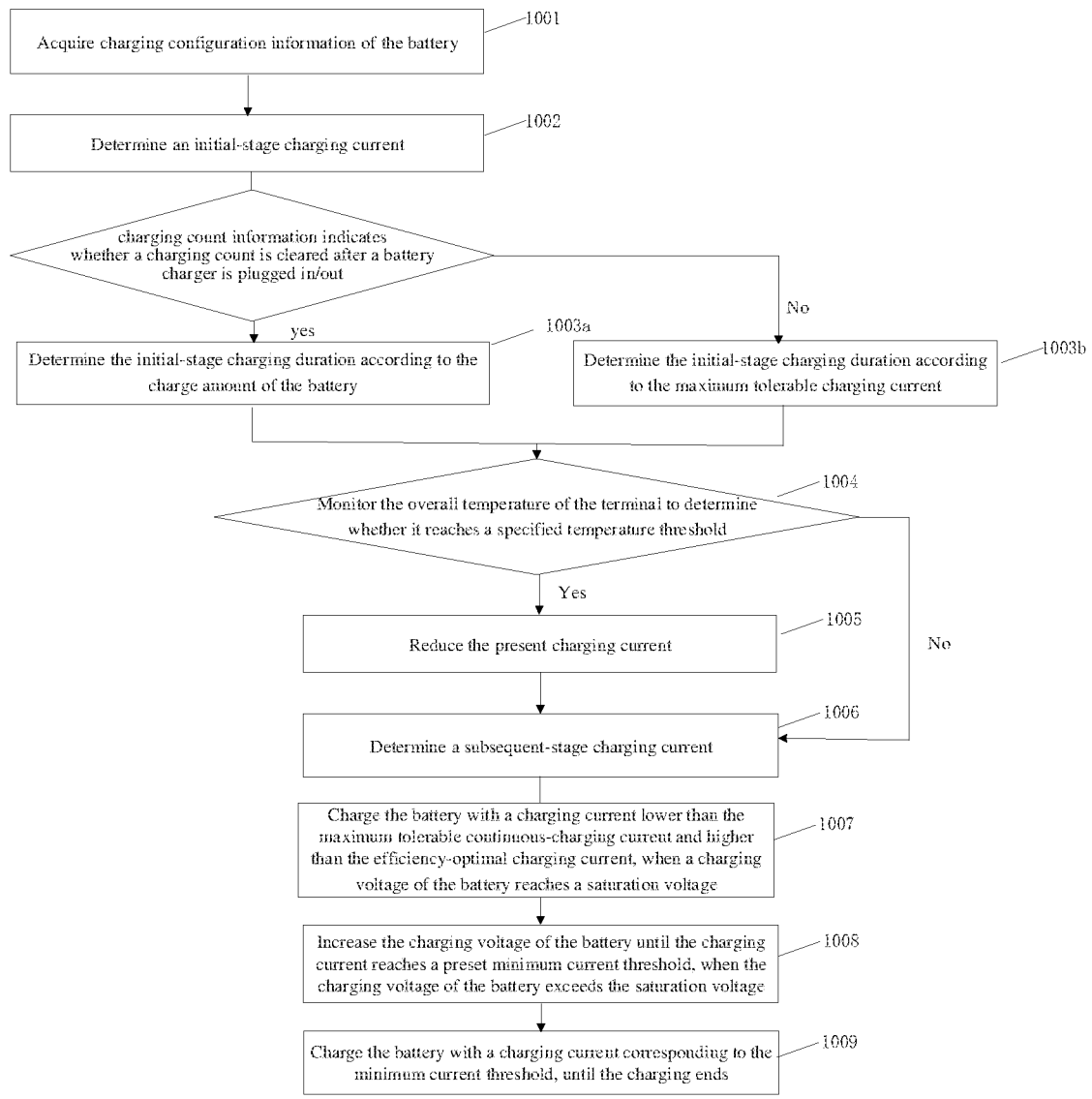
FIG. 3 illustrates a flow chart of a battery charging method according to an exemplary embodiment of the disclosure.

FIG. 3 illustrates a flow chart of a battery charging method according to an exemplary embodiment of the disclosure.

In step S1001, charging configuration information of the battery is acquired. The charging configuration information of the battery may include: information of a charging chip, information of a battery cell, and information of a battery protection board.

In step S1002, an initial-stage charging current is determined according to the charging configuration information of the battery.

In an embodiment, a maximum tolerable current value of the charging chip is determined according to the information of the charging chip, a maximum tolerable current value of the battery cell is determined according to the information of the battery cell, and a maximum tolerable current value of the battery protection board is determined according to the information of the battery protection board. A minimum value among the maximum tolerable current value of the charging chip, the maximum tolerable current value of the battery cell, and the maximum tolerable current value of the battery protection board is determined to be the initial-stage charging current.

In an embodiment, it is determined whether charging count information indicates a charging count is cleared after a battery charger is plugged in/out. If the charging count information indicates that the charging count is cleared after the battery charger is plugged in/out, step S1003$a$ is performed. If the charging count information indicates that the charging count is not cleared after the battery charger is plugged in/out, step S1003$b$ is performed.

In step S1003$a$, the initial-stage charging duration is determined according to the charge amount of the battery.

If the charging counter clears the charging time after the charger is plugged in/out, the battery is charged with the initial-stage charging current before the charge amount of the battery reaches a specified charge amount threshold. The specified charge amount threshold is determined according to a maximum charge amount, and a maximum tolerable charging duration in which the battery can be charged with the maximum tolerable charging current.

In step S1003$b$, the initial-stage charging duration is determined according to the maximum tolerable charging current.

If the charging count information indicates that the charging count is not cleared, the battery is charged with the initial-stage charging current in the maximum tolerable charging duration in which the battery can be charged with the maximum tolerable charging current.

In step S1004, an overall temperature of the terminal is monitored, and whether the overall temperature of the terminal reaches a specified temperature threshold is determined. When the overall temperature of the terminal reaches the specified temperature threshold, step S1005 is performed. When the overall temperature of the terminal does not reach the specified temperature threshold, step S1006 is performed.

In step S1005, the present charging current is reduced. The specified temperature threshold is determined according to a highest tolerable temperature of a surface of the terminal, and the highest tolerable temperature is determined according to temperature control information of the battery.

In step S1006, a subsequent-stage charging current is determined.

In an embodiment, the subsequent-stage charging current includes a maximum continuous-charging current and an efficiency-optimal charging current. The battery is charged with the maximum continuous-charging current when the surface temperature of the terminal is lower than the specified temperature threshold. The battery is charged with a charging current lower than the maximum continuous-charging current and higher than the efficiency-optimal charging current, when the surface temperature of the terminal is higher than the specified temperature threshold and is lower than the highest tolerable temperature. The battery is charged with the efficiency-optimal charging current, when the surface temperature of the terminal reaches the highest tolerable temperature.

In step S1007, the battery is charged with a charging current lower than the maximum continuous-charging current and higher than the efficiency-optimal charging current, when a charging voltage of the battery reaches a saturation voltage.

In step S1008, the charging voltage of the battery is increased until the charging current reaches a preset minimum current threshold, when the charging voltage of the battery exceeds the saturation voltage.

In step S1009, the battery is charged with a charging current corresponding to the minimum current threshold, until the charging ends.

Figure 4:
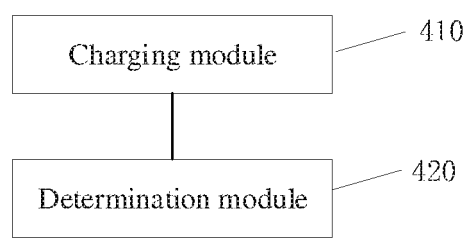
FIG. 4 illustrates a block diagram of a battery charging apparatus according to an exemplary embodiment of the disclosure.

FIG. 4 illustrates a block diagram of a battery charging apparatus according to another exemplary embodiment of the disclosure. The battery charging apparatus is applied to a terminal installed with a battery. The battery charging apparatus 400 includes: a charging module 410 and a determination module 420.

The charging module 410 is configured to charge the battery with an initial-stage charging current in an initial stage, until a charge state of the battery satisfies a preset condition.

The determination module 420 is configured to determine the initial-stage charging current. The initial-stage charging current may be a maximum tolerable charging current of the battery, which is determined according to charging configuration information of the battery.

The charging module 410 is further configured to charge the battery with a subsequent-stage charging current in a subsequent stage after the initial stage.

The determination module 420 is further configured to determine the subsequent-stage charging current. The subsequent-stage charging current may be a charging current, which is determined according to the charging configuration information and smaller than the maximum tolerable charging current.

In an embodiment, the charging configuration information of the battery includes: information of a charging chip, information of a battery cell and information of a battery protection board. The determination module 420 determines the initial-stage charging current according to the charging configuration information of the battery in the following way. A maximum tolerable current value of the charging chip is determined according to the information of the charging chip, a maximum tolerable current value of the battery cell is determined according to the information of the battery cell, and a maximum tolerable current value of the battery protection board is determined according to the information of the battery protection board. A minimum value among the maximum tolerable current value of the charging chip, the maximum tolerable current value of the battery cell, and the maximum tolerable current value of the battery protection board is taken to be the initial-stage charging current.

In an embodiment, the charging configuration information further includes charging count information. When the charging count information indicates that a charging count is cleared, the preset condition is that a charge amount of the battery reaches a specified charge amount threshold. The specified charge amount threshold is determined according to a maximum charge amount, and a maximum tolerable charging duration in which the battery can be charged with the maximum tolerable charging current. When the charging count information indicates that the charging count cannot be cleared, the preset condition is that a charging duration reaches the maximum tolerable charging duration in which the battery can be charged with the maximum tolerable charging current.

In an embodiment, the determination module 420 is further configured to determine the maximum tolerable charging duration in which the battery can be charged with the maximum tolerable charging current. The maximum tolerable charging duration is: a minimum value among a maximum tolerable duration of the charging chip, a maximum tolerable duration of the battery cell and a maximum tolerable duration of the battery protection board, when the battery is charged with the maximum tolerable charging current and a surface temperature of the terminal does not exceed a preset temperature threshold.

Figure 5:
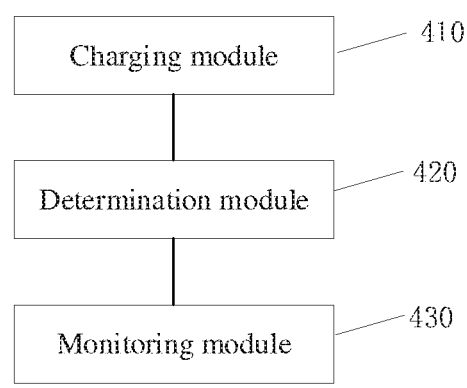
FIG. 5 illustrates a block diagram of a battery charging apparatus according to an exemplary embodiment of the disclosure.

FIG. 5 illustrates a block diagram of the battery charging apparatus 400 according to another exemplary embodiment of the disclosure. The battery charging apparatus 400 further includes a monitoring module 430. The monitoring module 430 is configured to monitor an overall temperature of the terminal. The charging module is further configured to reduce a present charging current when the monitoring module detects that a surface temperature of the terminal reaches a specified temperature threshold. The specified temperature threshold is determined according to a highest tolerable temperature of a surface of the terminal, and the highest tolerable temperature is determined according to temperature control information of the battery.

In an embodiment, the specified temperature threshold is lower than the highest tolerable temperature. The subsequent-stage charging current includes a maximum continuous-charging current and an efficiency-optimal charging current. The charging module 410 charges the battery with the subsequent-stage charging current in the following way: charging the battery with the maximum continuous-charging current when the surface temperature of the terminal is lower than the specified temperature threshold; charging the battery with a charging current lower than the maximum continuous-charging current and higher than the efficiency-optimal charging current, when the surface temperature of the terminal is higher than the specified temperature threshold and is lower than the highest tolerable temperature; and charging the battery with the efficiency-optimal charging current, when the surface temperature of the terminal reaches the highest tolerable temperature.

In an embodiment, when the surface temperature of the terminal is lower than the specified temperature threshold, the charging module 410 is further configured to: charge the battery with a charging current lower than the maximum continuous-charging current and higher than an efficiency-optimal charging current, when the charging voltage of the battery reaches the saturation voltage; increase the charging voltage of the battery until the charging current reaches a preset minimum current threshold, when the charging voltage of the battery exceeds the saturation voltage; and charge the battery with a charging current corresponding to the minimum current threshold, until the charging ends.

Figure 6:
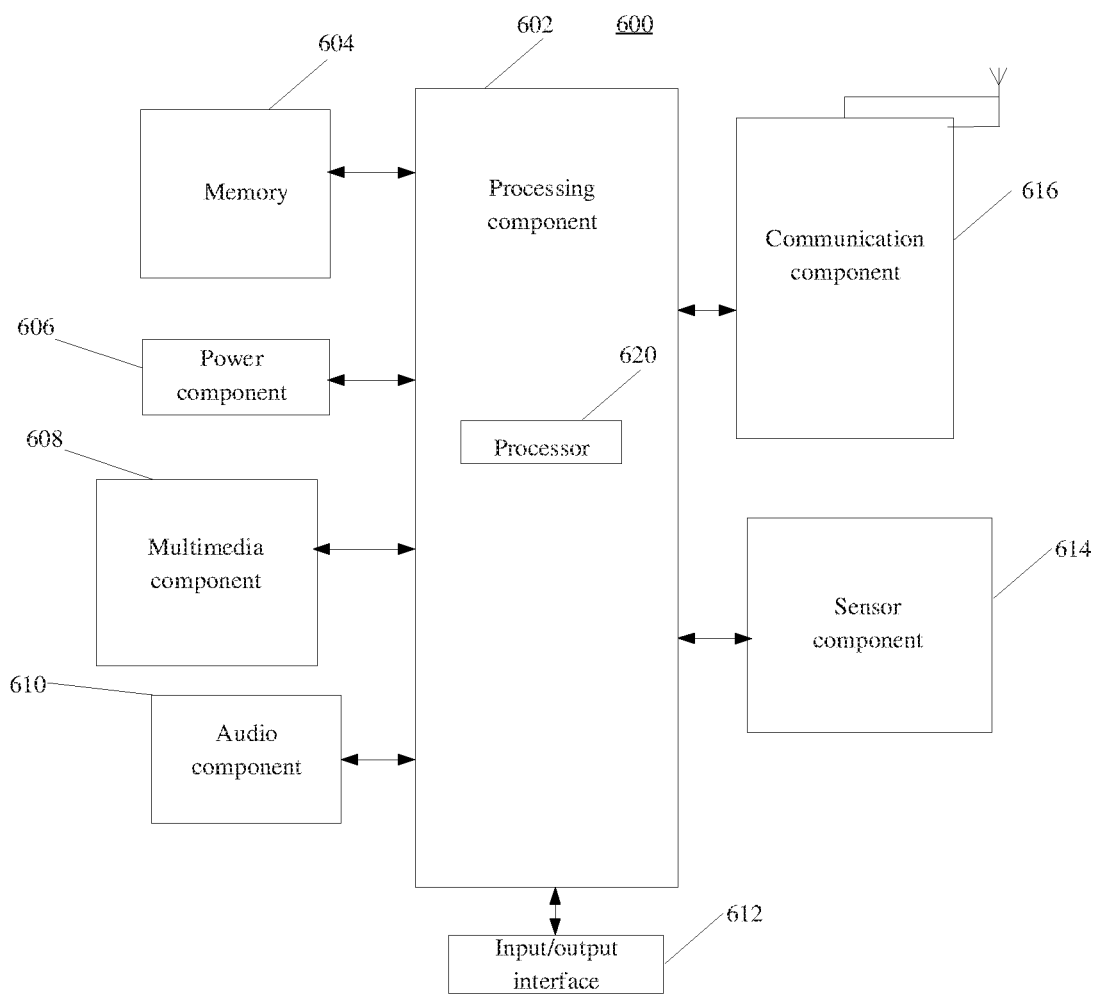
FIG. 6 illustrates a block diagram of a battery charging apparatus according to an exemplary embodiment of the disclosure.

FIG. 6 illustrates a block diagram of a battery charging apparatus 600 according to an exemplary embodiment. For example, the battery charging apparatus 600 may be a mobile phone, a computer, a digital broadcast terminal, a message transceiving device, a game console, a tablet device, medical equipment, fitness equipment, a personal digital assistant, and etc.

As illustrated in FIG. 6, the battery charging apparatus 600 may include one or more of the following: a processing component 602, a memory 604, a power component 606, a multi-media component 608, an audio component 610, an input/output (I/O) interface 612, a sensor component 614, and a communication component 616.

The processing component 602 generally controls the overall operation of the battery charging apparatus 600, such as operations associated with display, phone calls, data communication, camera operations and recording operations. The processing component 602 may include one or more processors 620 to execute instructions, so as to complete all or some steps in the methods above. In addition, the processing component 602 may include one or more modules for the interaction between the processing component 602 and the other components. For example, the processing component 602 may include a multi-media module for interaction between the multi-media component 608 and the processing component 602.

The memory 604 is configured to store various types of data so as to support operations at the battery charging apparatus 600. The examples of these types of data include instructions of any application or method operating on the battery charging apparatus 600, contact person data, phone book data, messages, pictures, video, etc. The memory 604 may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 606 supplies power for the various components of the battery charging apparatus 600. The power component 606 may include a power management system, one or more power sources, and other components associated with the generation, management and distribution of power for the battery charging apparatus 600.

The multi-media component 608 includes a screen serving as an output interface between the battery charging apparatus 600 and a user. In some embodiments, the screen may include a liquid crystal display (LCD) and a touch panel (TP). If the screen includes a touch panel, then the screen may be implemented as a touch screen so as to receive input signals from a user. The touch panel includes one or more touch sensors to sense touch, slide and gestures on the touch panel. The touch sensors may not only sense the boundary of a touch or slide action, but also may detect the duration and pressure related to the touch or slide operation. In some embodiments, the multi-media component 608 includes a front camera and/or a rear camera. When the battery charging apparatus 600 is in an operating mode, such as a photography mode or a video mode, the front camera and/or the rear camera may receive external multi-media data. Each of the front camera and the rear camera may be a fixed optical lens system or have a focal length or optical zoom capability.

The audio component 610 is configured to output and/or input an audio signal. For example, the audio component 610 includes a microphone (MIC), and when the battery charging apparatus 600 is in an operating mode, such as a calling mode, a recording mode and a voice recognition mode, the microphone is configured to receive external audio signals. The received audio signals can be further stored in the memory 604 or sent via the communication component 616. In some embodiments, the audio component 610 further includes a loudspeaker for outputting an audio signal.

The I/O interface 612 provides an interface between the processing component 602 and a peripheral interface module. The peripheral interface module may be a keyboard, a click wheel, a button, and etc. The button may include but is not limited to a home page button, a volume button, a start button and a locking button.

The sensor component 614 includes one or more sensors for providing state evaluation for the battery charging apparatus 600 at various aspects. For example, the sensor component 614 may detect an on/off state of the battery charging apparatus 600, and the relative positioning between components: for example, the components may be a display and keyboard of the battery charging apparatus 600. The sensor component 614 may also detect a position change of the battery charging apparatus 600 or a component of the battery charging apparatus 600, whether there is contact between a user and the battery charging apparatus 600, the orientation or acceleration/deceleration of the battery charging apparatus 600, and a temperature change of the apparatus 600. The sensor component 614 may include a proximity sensor configured to detect the existence of an object nearby without any physical contact. The sensor component 614 may also include an optical sensor, such as a CMOS or CCD image sensor, for use in an imaging application. In some embodiments, the sensor component 614 may also include an acceleration sensor, a gyroscope sensor, a magnetic sensor, a pressure sensor or a temperature sensor.

The communication component 616 is configured for wired or wireless communication between the battery charging apparatus 600 and another device. The battery charging apparatus 600 may access a communication standard based wireless network, such as WiFi, 4G, 5G or a combination thereof. In an exemplary embodiment, the communication component 616 receives broadcast signals or broadcast related information from an external broadcast management system through a broadcast channel. In an exemplary embodiment, the communication component 616 further comprises a near-field communication (NFC) module for short-range communication. In an exemplary embodiment, the communication component 616 may be implemented based on the radio-frequency identification (RFID) technique, the infrared data association (IrDA) technique, the ultra-wide band (UWB) technique, the Bluetooth (BT) technique or the like.

In an exemplary embodiment, the battery charging apparatus 600 may be implemented by one or more application-specific integrated circuits (ASICs), digital signal processors (DSPs), digital signal processing devices (DSPDs), programmable logic devices (PLDs), field programmable gate arrays (FPGAs), controllers, micro-controllers, micro-processors or other electronic elements, for executing the above methods.

In an exemplary embodiment, a non-transitory computer-readable storage medium including instructions is also provided, such as the memory 604 including instructions. The instructions may be executed by the processor 620 of the battery charging apparatus 600 to perform the above methods. For example, the non-transitory computer-readable storage medium may be a ROM, a random access memory (RAM), a CD-ROM, a magnetic tape, a floppy disk, an optical data storage device and the like.

A non-transitory computer-readable storage medium is provided. The storage medium has instructions stored therein. The instructions, when executed by a processor of a mobile terminal, cause the mobile terminal to perform any of the above described battery charging methods.

The technical solutions provided in embodiments of the disclosure may have the following beneficial effects: existing charging configurations can be fully utilized without increasing design costs, so as to save on charging time, improve charging efficiency and thus promote user experience.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A battery charging method applied to a terminal, comprising:
in an initial stage, charging a battery with an initial-stage charging current, until a charge state of the battery satisfies a preset condition, wherein the initial-stage charging current is a maximum tolerable charging current of the battery determined according to charging configuration information of the battery;
in a subsequent stage after the initial stage, charging the battery with a subsequent-stage charging current, wherein the subsequent-stage charging current is determined according to the charging configuration information and is smaller than the maximum tolerable charging current; and
monitoring a surface temperature of the terminal, and reducing a present charging current when the surface temperature of the terminal reaches a specified temperature threshold,
wherein the specified temperature threshold is determined according to a highest tolerable temperature of a surface of the terminal, and the highest tolerable temperature is determined according to temperature control information of the battery.

2. The battery charging method according to claim 1, wherein the charging configuration information of the battery comprises: information of a charging chip, information of a battery cell, and information of a battery protection board; and determining the initial-stage charging current according to the charging configuration information of the battery comprises:
determining, according to the information of the charging chip, the information of the battery cell, and the information of the battery protection board, a maximum tolerable current value of the charging chip, a maximum tolerable current value of the battery cell, and a maximum tolerable current value of the battery protection board; and
determining a minimum value among the maximum tolerable current value of the charging chip, the maximum tolerable current value of the battery cell, and the maximum tolerable current value of the battery protection board, to be the initial-stage charging current.

3. The battery charging method according to claim 2, wherein the charging configuration information further comprises charging count information;
when the charging count information indicates that a charging count is cleared, the preset condition is that a charge amount of the battery reaches a specified charge amount threshold, wherein the specified charge amount threshold is determined according to a maximum charge amount, and a maximum tolerable charging duration in which the battery can be charged with the maximum tolerable charging current; and
when the charging count information indicates that the charging count is not cleared, the preset condition is that a charging duration reaches the maximum tolerable charging duration.

4. The battery charging method according to claim 3, further comprising:
determining, as the maximum tolerable charging duration, a minimum value among a maximum tolerable duration of the charging chip, a maximum tolerable duration of the battery cell, and a maximum tolerable duration of the battery protection board, when the battery is charged with the maximum tolerable charging current and the surface temperature of the terminal does not exceed a preset temperature threshold.

5. The battery charging method according to claim 1, wherein the specified temperature threshold is smaller than the highest tolerable temperature;
wherein the subsequent-stage charging current comprises a maximum tolerable continuous-charging current and an efficiency-optimal charging current; and
wherein charging the battery with the subsequent-stage charging current comprises:
charging the battery with the maximum tolerable continuous-charging current, when the surface temperature of the terminal is lower than the specified temperature threshold;
charging the battery with a charging current lower than the maximum tolerable continuous-charging current and higher than the efficiency-optimal charging current, when the surface temperature of the terminal is higher than the specified temperature threshold and is lower than the highest tolerable temperature; and
charging the battery with the efficiency-optimal charging current, when the surface temperature of the terminal reaches the highest tolerable temperature.

6. The battery charging method according to claim 5, wherein when the surface temperature of the terminal is lower than the specified temperature threshold, the method further comprises:
charging the battery with the charging current lower than the maximum tolerable continuous-charging current and higher than the efficiency-optimal charging current, when a charging voltage of the battery reaches a saturation voltage;
increasing the charging voltage of the battery until the charging current reaches a preset minimum current threshold, when the charging voltage of the battery exceeds the saturation voltage; and
charging the battery with a charging current corresponding to the minimum current threshold, until the charging ends.

7. A terminal, comprising:
a processor; and
a memory configured to store instructions executable by the processor,
wherein the processor is configured to:
in an initial stage, charge a battery with an initial-stage charging current, until a charge state of the battery satisfies a preset condition, wherein the initial-stage charging current is a maximum tolerable charging current of the battery determined according to charging configuration information of the battery;
in a subsequent stage after the initial stage, charge the battery with a subsequent-stage charging current, wherein the subsequent-stage charging current is determined according to the charging configuration information and is smaller than the maximum tolerable charging current; and monitor a surface temperature of the terminal, and reduce a present charging current when the surface temperature of the terminal reaches a specified temperature threshold, wherein the specified temperature threshold is determined according to a highest tolerable temperature of a surface of the terminal, and the highest tolerable temperature is determined according to temperature control information of the battery.

8. The terminal according to claim 7, wherein the charging configuration information of the battery comprises: information of a charging chip, information of a battery cell, and information of a battery protection board; and in determining the initial-stage charging current according to the charging configuration information of the battery, the processor is further configured to:

determine, according to the information of the charging chip, the information of the battery cell, and the information of the battery protection board, a maximum tolerable current value of the charging chip, a maximum tolerable current value of the battery cell, and a maximum tolerable current value of the battery protection board; and determine a minimum value among the maximum tolerable current value of the charging chip, the maximum tolerable current value of the battery cell, and the maximum tolerable current value of the battery protection board, to be the initial-stage charging current.

9. The terminal according to claim 8, wherein the charging configuration information further comprises charging count information;

when the charging count information indicates that a charging count is cleared, the preset condition is that a charge amount of the battery reaches a specified charge amount threshold, wherein the specified charge amount threshold is determined according to a maximum charge amount, and a maximum tolerable charging duration in which the battery can be charged with the maximum tolerable charging current; and when the charging count information indicates that the charging count is not cleared, the preset condition is that a charging duration reaches the maximum tolerable charging duration.

10. The terminal according to claim 9, wherein the processor is further configured to:

determine, as the maximum tolerable charging duration, a minimum value among a maximum tolerable duration of the charging chip, a maximum tolerable duration of the battery cell, and a maximum tolerable duration of the battery protection board, when the battery is charged with the maximum tolerable charging current and the surface temperature of the terminal does not exceed a preset temperature threshold.

11. The terminal according to claim 7, wherein the specified temperature threshold is smaller than the highest tolerable temperature;

wherein the subsequent-stage charging current comprises a maximum tolerable continuous-charging current and an efficiency-optimal charging current; and wherein in charging the battery with the subsequent-stage charging current, the processor is further configured to:

charge the battery with the maximum tolerable continuous-charging current, when the surface temperature of the terminal is lower than the specified temperature threshold;

charge the battery with a charging current lower than the maximum tolerable continuous-charging current and higher than the efficiency-optimal charging current, when the surface temperature of the terminal is higher than the specified temperature threshold and is lower than the highest tolerable temperature; and charge the battery with the efficiency-optimal charging current, when the surface temperature of the terminal reaches the highest tolerable temperature.

12. The terminal according to claim 11, wherein when the surface temperature of the terminal is lower than the specified temperature threshold, the processor is further configured to:

charge the battery with the charging current lower than the maximum tolerable continuous-charging current and higher than the efficiency-optimal charging current, when a charging voltage of the battery reaches a saturation voltage;

increase the charging voltage of the battery until the charging current reaches a preset minimum current threshold, when the charging voltage of the battery exceeds the saturation voltage; and charge the battery with a charging current corresponding to the minimum current threshold, until the charging ends.

13. A non-transitory computer-readable storage medium having stored therein instructions that, when executed by a processor of a terminal, cause the terminal to perform a battery charging method, the method comprising:

in an initial stage, charging a battery with an initial-stage charging current, until a charge state of the battery satisfies a preset condition, wherein the initial-stage charging current is a maximum tolerable charging current of the battery determined according to charging configuration information of the battery;

in a subsequent stage after the initial stage, charging the battery with a subsequent-stage charging current, wherein the subsequent-stage charging current is determined according to the charging configuration information and is smaller than the maximum tolerable charging current; and monitoring a surface temperature of the terminal, and reducing a present charging current when the surface temperature of the terminal reaches a specified temperature threshold, wherein the specified temperature threshold is determined according to a highest tolerable temperature of a surface of the terminal, and the highest tolerable temperature is determined according to temperature control information of the battery.

14. The non-transitory computer-readable storage medium according to claim 13, wherein the charging configuration information of the battery comprises: information of a charging chip, information of a battery cell and information of a battery protection board; and determining the initial-stage charging current according to the charging configuration information of the battery comprises:

determining, according to the information of the charging chip, the information of the battery cell, and the information of the battery protection board, a maximum tolerable current value of the charging chip, a maximum tolerable current value of the battery cell, and a maximum tolerable current value of the battery protection board; and determining a minimum value among the maximum tolerable current value of the charging chip, the maximum tolerable current value of the battery cell, and the maximum tolerable current value of the battery protection board, to be the initial-stage charging current.

15. The non-transitory computer-readable storage medium according to claim 14, wherein the charging configuration information further comprises charging count information;

when the charging count information indicates that a charging count is cleared, the preset condition is that a charge amount of the battery reaches a specified charge amount threshold, wherein the specified charge amount threshold is determined according to a maximum charge amount, and a maximum tolerable charging duration in which the battery can be charged with the maximum tolerable charging current; and when the charging count information indicates that the charging count is not cleared, the preset condition is that a charging duration reaches the maximum tolerable charging duration.

16. The non-transitory computer-readable storage medium according to claim 15, wherein the method further comprises:

determining, as the maximum tolerable charging duration, a minimum value among a maximum tolerable duration of the charging chip, a maximum tolerable duration of the battery cell, and a maximum tolerable duration of the battery protection board, when the battery is charged with the maximum tolerable charging current and the surface temperature of the terminal does not exceed a preset temperature threshold.

17. The non-transitory computer-readable storage medium according to claim 13, wherein the specified temperature threshold is smaller than the highest tolerable temperature;

wherein the subsequent-stage charging current comprises a maximum tolerable continuous-charging current and an efficiency-optimal charging current; and wherein charging the battery with the subsequent-stage charging current comprises:

charging the battery with the maximum tolerable continuous-charging current, when the surface temperature of the terminal is lower than the specified temperature threshold;

charging the battery with the charging current lower than the maximum tolerable continuous-charging current and higher than the efficiency-optimal charging current, when the surface temperature of the terminal is higher than the specified temperature threshold and is lower than the highest tolerable temperature; and charging the battery with the efficiency-optimal charging current, when the surface temperature of the terminal reaches the highest tolerable temperature.

\* \* \* \* \*